US006999647B2

(12) United States Patent
Johnson

(10) Patent No.: US 6,999,647 B2
(45) Date of Patent: Feb. 14, 2006

(54) FAST PIVOT MECHANISM

(75) Inventor: Theodis Johnson, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/854,406

(22) Filed: May 25, 2004

(65) Prior Publication Data
US 2005/0265651 A1 Dec. 1, 2005

(51) Int. Cl.
G02B 6/42 (2006.01)

(52) U.S. Cl. .............................. 385/16; 385/6; 385/18; 385/22

(58) Field of Classification Search .................... 385/6, 385/16–24; 200/4, 11 DA, 11 R; 359/872–874; 398/45–57
See application file for complete search history.

(56) References Cited

U.S. PATENT DOCUMENTS

| 4,896,935 A | 1/1990 | Lee |
| 5,000,534 A | 3/1991 | Watanabe et al. |
| 5,078,514 A | 1/1992 | Valette et al. |
| 5,278,692 A | 1/1994 | Delapierre |
| 5,999,669 A * | 12/1999 | Pan et al. ..................... 385/18 |
| 6,208,777 B1 | 3/2001 | Jing |

FOREIGN PATENT DOCUMENTS

| EP | 0159406 A | 10/1985 |
| JP | 02124510 A | 5/1990 |
| WO | 02/8814 A1 | 1/2002 |

OTHER PUBLICATIONS

U.S. Appl. No. 10/748,974, "Fast Insertion Means and Method", filed Dec. 29, 2003.
U.S. Appl. No. 10/103,534, "High Speed Optical Element Switching Mechanism", filed Mar. 20, 2002.
PCT International Search Report: PCT/US2005/018364, Applicant Reference No. H0006277-5705, Sep. 29, 2005, EP International Search Authority, 7 pages.

* cited by examiner

Primary Examiner—Phan T. H. Palmer
(74) Attorney, Agent, or Firm—Kurt A. Luther

(57) ABSTRACT

A method and apparatuses are provided for switching an optical element into and out of an optical path. The apparatus comprises an arm assembly having an axis, first and second arms, first and second latch mechanisms, a stop element, and a solenoid. The first and second arms are coupled to the axis, and one of the arms is configured to selectively rotate relative to the other between first and second rotational positions. The latch mechanisms are mounted to the first arm at first and second mounting positions. The stop element is coupled to the second arm and positioned between and capable of contacting the latch mechanisms. The solenoid is coupled to the arm assembly and configured to provide kinetic energy to the one of the first and second arms configured to rotate to thereby cause the stop element to selectively contact the first latch mechanism and the second latch mechanism.

29 Claims, 4 Drawing Sheets

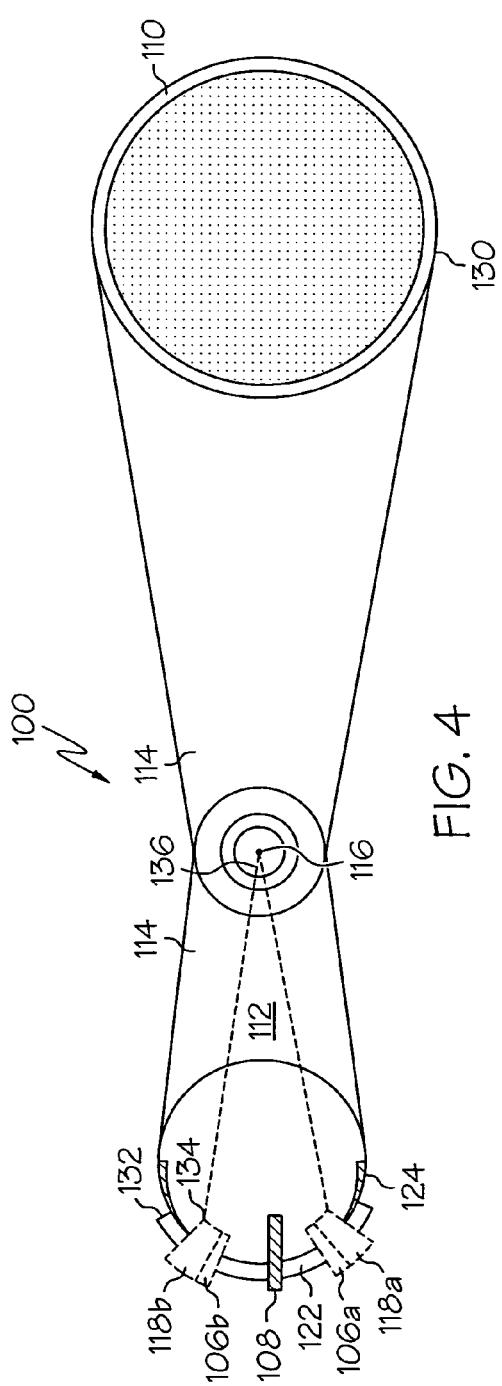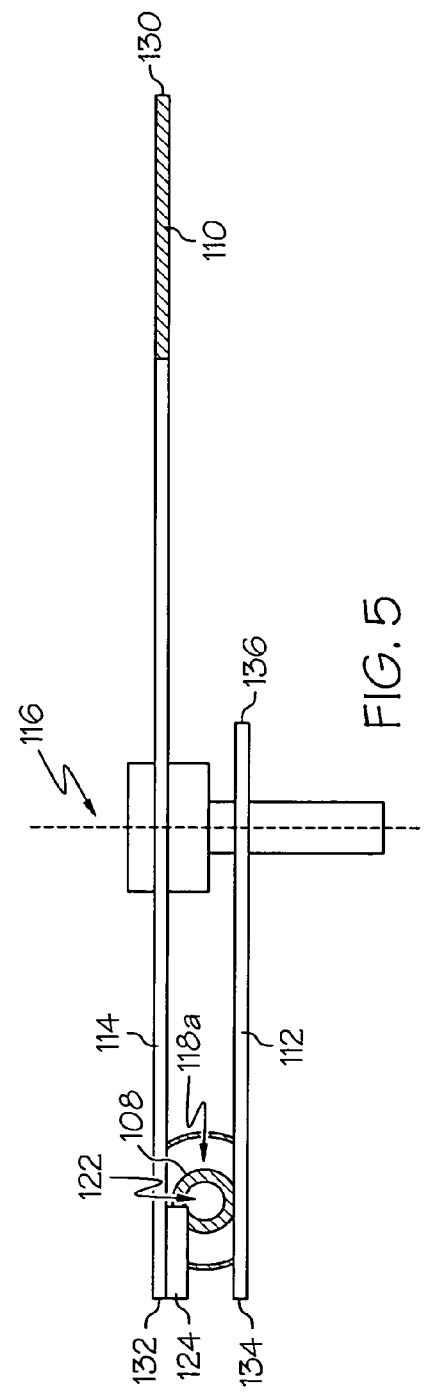

FAST PIVOT MECHANISM

FIELD OF THE INVENTION

The present invention relates to optical elements and, more specifically, relates to mechanisms for high speed switching of optical elements.

BACKGROUND OF THE INVENTION

Various systems and devices such as, for example, optical test instruments and equipment, include one or more optical elements, which may be provided to implement, for example, optical filtering. In some of these systems, it may be desirable to rapidly switch the optical elements into and out of an optical path. In the past, optical element switching has been accomplished using, for example, a wheel mechanism that is configured to rotate the optical elements into and out of the optical path. In one exemplary wheel mechanism embodiment, the optical elements are arranged around the perimeter of a wheel. As different optical elements are to be moved into and out of the optical path, a motor or other driver rotates the wheel, stopping when the desired optical element is in the optical path.

Although wheel mechanisms generally operate safely, these mechanisms also suffer certain disadvantages. For example, the configuration of many of these wheel mechanisms provides for sequential, rather than random, access to the elements at the edges of the wheel. As a result, the amount of time and energy that may be used to switch one element into the optical path and another optical element out of the optical path can be undesirably high. This may be most pronounced when the wheel is used to move optical elements into and out of the optical path that are located on opposite sides of the wheel.

Wheel mechanisms may also have complex configurations, which may, in some cases, decrease system reliability. Moreover, these complex configurations may also dissipate significant power, which can negatively impact the thermal profile of the system.

Hence, there is a need for a switch assembly that addresses one or more of the above-noted drawbacks. Namely, a switch assembly that can rapidly switch an optical element into and out of an optical path and/or a switch assembly that uses less power to release the switch from a latched position, and/or that is simple in design, and/or low in cost to construct is needed. The present invention addresses one or more of these needs.

BRIEF SUMMARY OF THE INVENTION

An apparatus is provided for switching an optical element into and out of an optical path. The apparatus includes first and second arms coupled to an axis. One of the first and second arms is configured to selectively rotate relative to the other between first and second rotational positions. A first and a second latch mechanism are mounted to the first arm at first and second mounting positions, respectively. A stop element is coupled to the second arm so as to be positioned between and capable of contacting the first and second latch mechanisms. A solenoid is coupled to the first and second arms and configured to provide kinetic energy to the one of the first and second arms configured to rotate to thereby cause the stop element to selectively contact the first latch mechanism and the second latch mechanism.

A method for switching an optical element into and out of the optical path is also provided. The method uses an optical switching device that has a rotating arm coupled to an axis and configured to selectively rotate between first and second rotational positions, a second arm coupled to the axis, a stop element and an electromagnetic core coupled to the rotating arm, an electromagnetic coil coupled to the second arm, and first and second latch mechanisms mounted to the second arm at first and second mounting positions, respectively, positioned and configured to contact the stop element. The method comprises pulsing energy to the electromagnetic coil to produce a magnetic field in a first direction, attracting the electromagnetic core toward the first direction to thereby rotate the rotating arm in the first direction, and latching the stop element to the first latch mechanism to stop rotation of the rotating arm.

BRIEF DESCRIPTION OF THE DRAWINGS

The present invention will hereinafter be described in conjunction with the following drawing figures, wherein like numerals denote like elements, FIGS. 2–4 are top schematic views of various exemplary embodiments of the optical element switching mechanism; and FIG. 5 is a side schematic view of another exemplary embodiment of the optical element switching mechanism.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
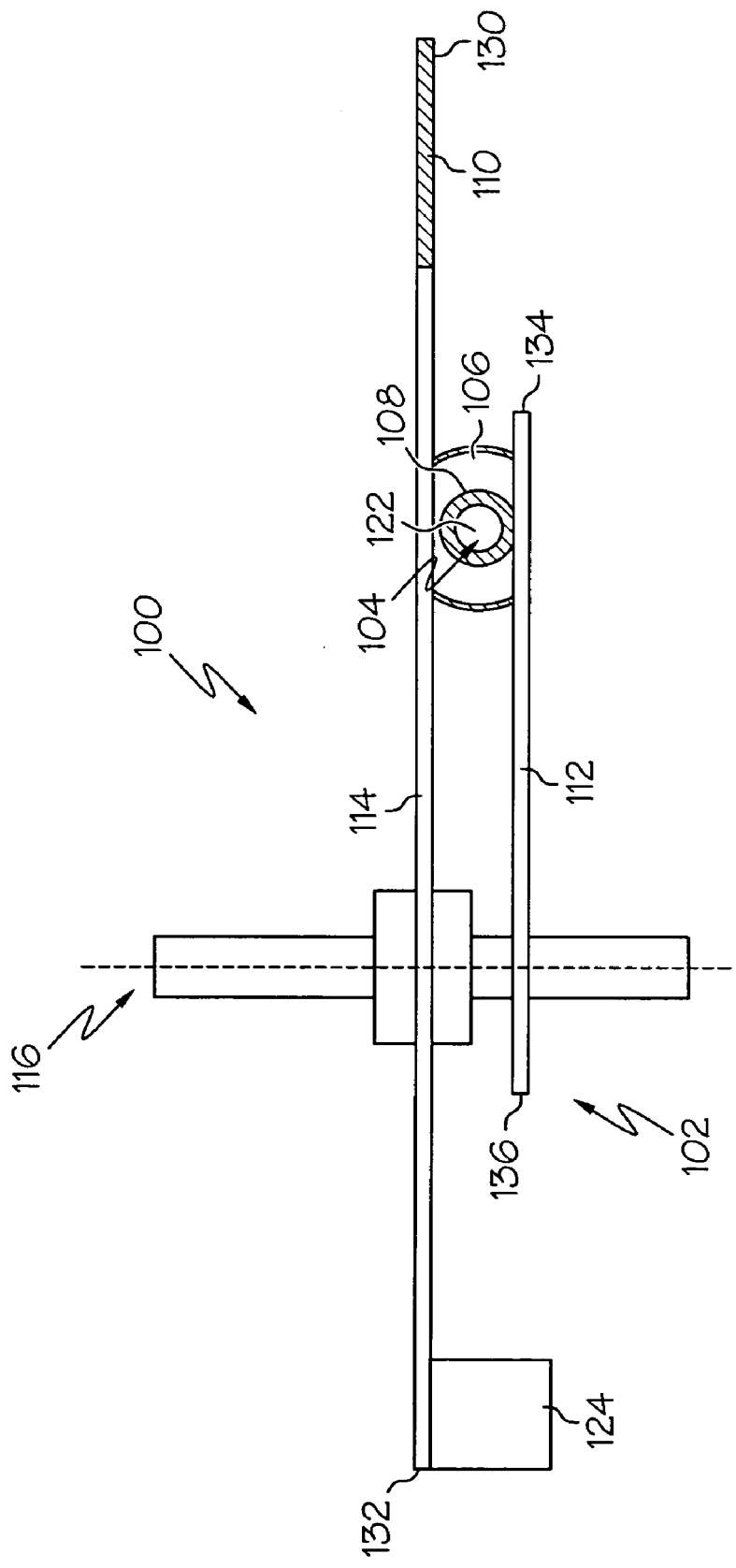
FIG. 1 is a side schematic view of an optical element switching mechanism.
Figure 2:
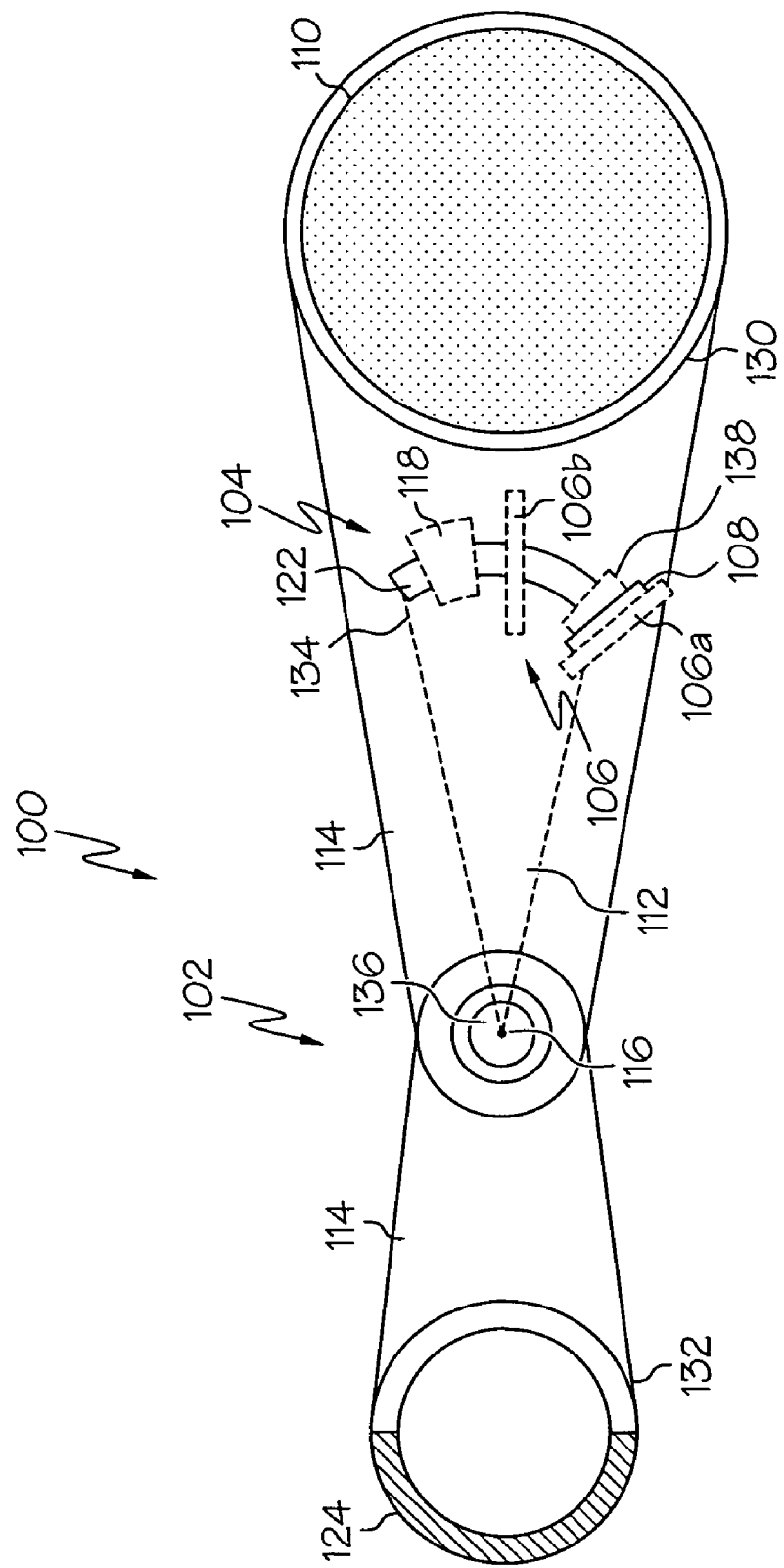

Turning now to FIGS. 1 and 2, an optical switching mechanism according to one exemplary embodiment is shown. The optical switching assembly 100 includes an arm assembly 102, at least one solenoid 104, a latch assembly 106, and a stop element 108. The solenoid 104, latch assembly 106, and stop element 108 are coupled to the arm assembly 102. Optionally, an optical element 110 may be coupled to the arm assembly 102 as well. Each of these components will now be discussed in further detail.

The arm assembly 102 includes first and second arms 112, 114 and an axis 116. The arms 112, 114 each include first ends 130, 134 and second ends 132, 136, respectively. Each arm 112, 114 is mounted to the axis 116 at a point between its respective ends, and at least one of the arms 112, 114 is configured to rotate relative to the other arm 112, 114. In an exemplary embodiment, the first and second arms 112, 114 are configured such that one arm is stationary and the other arm is capable of rotational movement at least between first and second rotational positions, which may be, for example, into and out of an optical path. In another exemplary embodiment, both arms 112, 114 are capable of rotational movement. The rotating arm is rotationally coupled to the axis via any one of numerous suitable devices, such as, for example, flex pivots, bearings, and flexural elements.

The rotating arm is preferably constructed with sufficient rigidity to effectively control the position of elements that may be mounted thereon and to minimize the vibration those elements may experience during or after rotation of the rotating arm. Any suitable material or device may be used to construct or to comprise the rotating arm. The stationary arm is configured to provide sufficient support to maintain a stationary position of elements that may be coupled thereto.

The axis 116 is configured to provide positioning for both the first and second arms 112, 114 and, additionally, to provide kinetic energy to rotate the rotating arm between at least the first and second rotational positions. In this regard, the axis 116 may include a support section and one or more suitable rotational devices. The rotational device may comprise a spring that, when supplied with additional energy, can store the energy for future use or immediately transfer the energy to rotate the rotating arm. Because the spring is capable of storing energy, its use as part of the rotational device minimizes power consumption. Suitable rotational devices that have springs, include but are not limited to, a torsion bar, torsion spring, or spring assembly.

In one exemplary embodiment, the rotational device provides a force to rotate the rotating arm toward the first rotational position or second rotational position. The rotational device of the axis 116 may be further configured to bias the rotating arm toward a neutral rotational position that is substantially centered between the first and second rotational positions. The rotational device may be even further configured such that when a force is provided to rotate the rotating arm toward the first rotational position, the rotational device provides an opposing force that pulls the rotating arm back to the neutral position, or optionally, past the neutral position and to a position proximate the second rotational position. Likewise, when the rotating arm swings toward the second rotational position, the rotational device provides an opposing force to pull the rotating arm back to the neutral position, or alternatively, to a position proximate the first rotational position. In yet another embodiment, the rotational device is configured to provide kinetic energy to cause the rotating arm to rotate back and forth in a harmonic motion.

Turning to FIG. 2, the latch assembly 106 includes a first latch mechanism 106a and a second latch mechanism 106b, which are each coupled to the arm assembly 102 at first and second mount positions. The latch assembly 106 may be coupled to either arm 112, 114 and either the stationary or rotating arm. It is noted that the first and second mount positions substantially coincide with first and second rotational positions, respectively, of the rotating arm. As described in further detail below, the latch mechanisms 106a, 106b are configured to selectively hold the rotating arm in either the first or second rotational position. It will be appreciated that the first and second rotational positions may be any one of numerous rotational positions, which may be selected to meet the requirements of the system into which the switch assembly 100 is installed.

The latch mechanisms 106a, 106b may be any one of numerous known devices that are operable to selectively hold the rotating arm in one of the two rotational positions and, in some embodiments, to supply additional rotational energy to the rotating arm to commence, or complete, its rotation, or both. The latch mechanisms 106a, 106b preferably employ electromagnetic or magnetic devices, or a combination of both, to hold the rotating arm. Suitable devices that may be employed include, but are not limited to, electromagnets, magnetic coils, pole pieces, or any appropriate combination thereof. The latch mechanisms 106a, 106b will preferably hold the rotating arm with little or no power consumption.

The stop element 108 is coupled to the arm assembly 102 and positioned at a predetermined point between the first and second latch mechanisms 106a, 106b. The stop element 108 preferably is coupled to the arm 112, 114 to which the latch assembly 106 is not coupled and is configured to latch to one of the latch mechanisms 106a, 106b, when the rotating arm is in the first or second rotational positions. The stop element 108 is constructed of any one of numerous types of materials appropriate for magnetically latching to the latch mechanisms 106a, 106b, such as a permanent magnet.

To damp vibration that may occur when the stop element 108 and latch mechanism 106a, 106b contact one another, a damping coil 138 may be coupled proximate the stop element 108. The damping coil 138 is preferably a small shorted coil of wire that provides intrinsic damping as the stop element 108 approaches latch mechanisms 106a, 106b.

Selective rotation of the rotating arm is facilitated by at least one solenoid 104 that is coupled to the arm assembly 102. The solenoid 104 is configured to provide additional kinetic energy to the optical switching mechanism 100 and comprises an electromagnetic coil 118 and an electromagnetic core 122. The electromagnetic coil 118 may be coupled to either the first or second arm 112, 114, while the electromagnetic core 122 is coupled to or formed as part of the other arm 112, 114.

The electromagnetic coil 118 is constructed of a wire having a passage therethrough. The electromagnetic coil 118 is electrically coupled to a power source (not shown), for example, a low voltage source, to selectively supply a pulse of an appropriate polarity, magnitude, and duration to cause the coil 118 to generate a magnetic field having a desired magnitude and direction within the passage.

The electromagnetic core 122 comprises a magnetically permeable material capable of attraction to the magnetic field generated by the coil 118. Suitable materials include, but are not limited to, iron, nickel, or cobalt. The electromagnetic core 122 is further configured to be capable of moving through the passage of the coil 118. Thus, the electromagnetic core 122 may have any one of numerous shapes suitable for passing through passage, such as a generally elongate shape, a rod, or a bar. Optionally, the electromagnetic core 122 may be configured to serve as a guide for the rotational movement of the rotating arm, and thus, may be arc-shaped.

The solenoid 104 cooperates with the latch assembly 106 and stop element 108 to effect the operation of the switch assembly 100. To this end, any number of solenoids 104 having any one of numerous configurations may be employed in the optical switching assembly 100. FIG. 2 illustrates one exemplary optical switching assembly 100 that uses one solenoid 104. The electromagnetic coil 118 of the solenoid 104 is mounted to the first arm 112 and is electrically coupled to a power source (not shown) that provides energy pulses thereto. The latch mechanisms 106a, 106b are mounted to the first arm 112 and comprise pole pieces that are configured to magnetically latch to the stop element 108. The stop element 108 and electromagnetic core 122 of the solenoid 108 are mounted to the second arm 114 such that the stop element 108 can selectively contact the desired latch mechanism 106a, 106b. In this embodiment, the first arm 112 is configured to remain stationary relative to rotational movement of the second arm 114, however, as will be appreciated, the first arm 112 may be configured to rotate relative to a stationary second arm 114, or alternatively, both arms 112, 114 may rotate relative to each other.

When the power source is turned on and a pulse having a desired magnitude, polarity and duration is administered to the electromagnetic coil 118, a magnetic field is generated in a first direction. As a result, the electromagnetic core 122 becomes magnetized and attracted towards the first direction of the magnetic field, thereby supplying kinetic energy to the rotating second arm 114 to move in the first direction until the stop element 108 mounted on the second arm 114 contacts and magnetically couples with the first latch mechanism 106a at the first rotational position. If it is desired that the second arm 114 switch to the second rotational position, the power source provides a pulse having a reverse polarity to thereby generate a magnetic field in a second direction and, accordingly, the magnetic attraction of the electromagnetic core 122 changes with the magnetic field to cause the core 122 to move in the second direction. The strength of the magnetic field is such that it overcomes the magnetic attraction of the stop element 108 to the first latch mechanism 106a so that the electromagnetic core 122 travels until the stop element 108 contacts and magnetically couples with the second latch mechanism 106b.

Figure 3:
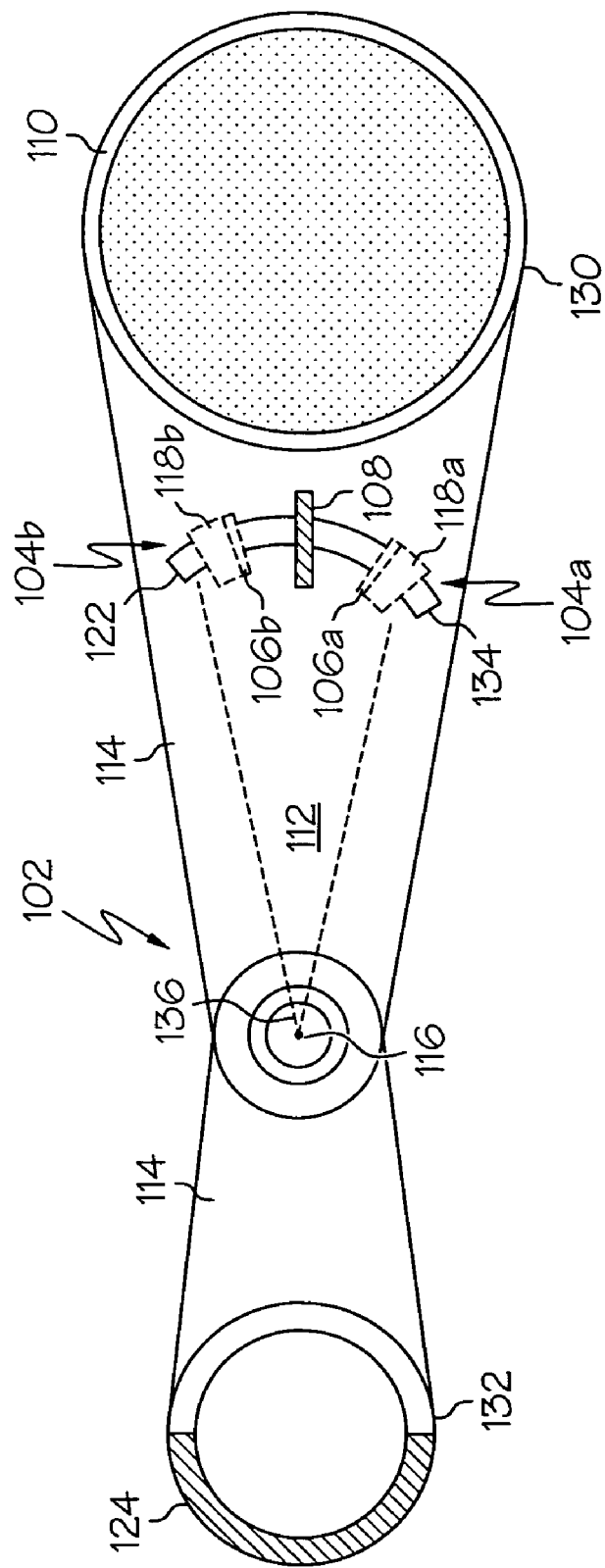

FIG. 3 illustrates another exemplary embodiment of the optical switch assembly 100. In this embodiment, two solenoids 104a, 104b are employed. The two solenoids 104a, 104b include first and second electromagnetic coils 118a, 118b and an electromagnetic core 122. Each electromagnetic coil 118a, 118b is electrically coupled to a power source (not shown) used to pulse energy thereto. In alternate embodiments, the coils 118a, 118b may each be coupled to different power sources, or the same power source.

The first and second electromagnetic coils 118a, 118b are coupled to the first arm 112 and may be positioned along any suitable portion of the first arm 112. The first and second latch mechanisms 106a, 106b are also coupled to the first arm 112. In one exemplary embodiment, such as the embodiment illustrated in FIG. 3, the first and second electromagnetic coils 118a, 118b are each positioned outside of and proximate the first and second latch mechanisms 106a, 106b, respectively. In another embodiment, the electromagnetic coils 118a, 118b are coupled to the first and second latch mechanisms 106a, 106b, respectively.

The electromagnetic core 122 is an arc-shaped rail coupled to the second arm 114 so as to be sufficiently close in proximity to the electromagnetic coils 118a, 118b to be magnetically attracted thereto. Though a single electromagnetic core 122 is depicted, it will be appreciated that more than one electromagnetic core 122 may be employed to associate with each electromagnetic coil 118a, 118b. The stop element 108 is also coupled to the second arm 114 and is mounted substantially proximate the center of the electromagnetic core 122. Preferably, the stop element 108 is mounted to a point that is substantially in between the first and second latch mechanisms 106a, 106b to be capable of latching to either the first or second latch mechanism 106a, 106b and optionally, can be coupled directly to the electromagnetic core 122. In the embodiment depicted in FIG. 3, the first arm 112 is configured to remain stationary relative to rotational movement of the second arm 114, however, as appreciated by the skilled artisan, the first arm 112 may be configured to rotate relative to a stationary second arm 114, or both arms 112, 114 may be configured to rotate relative to each other.

In one exemplary embodiment of the invention, both of the coils 118a, 118b are configured to operate with each other so that each magnetic field generated by each of the coils 118a, 118b has the same direction. As a result, the electromagnetic core 122 is pulled by the first coil 118a in a first direction and simultaneously pushed by the second coil 118b in the same first direction.

In another exemplary embodiment, the coils 118a, 118b act as two independent solenoids. A pulse having an appropriate polarity, magnitude, and direction is supplied to the first coil 118a causing the electromagnetic core 122 to be pulled in the first direction so that the stop element 108 magnetically couples to the first latch mechanism 106a. When it is desired to switch the optical element 110 to the second rotational position, a pulse having an appropriate polarity, magnitude, and direction is supplied to the second coil 118b to generate a magnetic field in the second direction having a strength that overcomes the magnetic attraction of the stop element 108 and the first latch mechanism 106a. The electromagnetic core 122 then travels in the second direction until the stop element 108 magnetically couples to the second latch mechanism 106b. In yet another embodiment, the first and second coils 118a, 118b each is configured to push the core 122 towards the second and first latch mechanisms 106a, 106b, respectively.

As will be appreciated by those with skill in the art, the solenoid(s) 104, latch assembly 106, and stop element 108 may have any one of numerous arrangements along the arm 112, 114 relative to an optical element 110 that may be coupled to the switching assembly 100. The arrangement of the components may depend on a variety of factors, such as space constraints of the optical switch assembly, cost factors, availability of part for constructing the assembly, or other factors.

FIGS. 1–3 illustrate one exemplary arrangement of the optical switching assembly 100. In these embodiments, the electromagnetic coil 118 and the latch assembly 106 are coupled to the first arm 112 proximate its first end 134. The optical element 110 is coupled to the second arm first end 130, while both the stop element 108 and electromagnetic core 122 are also mounted to the second arm 114 at points between the optical element 110 and the axis 116. To compensate for any imbalance between the weight of the first arm first end 130 and the second arm second end 132, a counterbalance 124 is coupled to the second end of the second arm 132.

FIGS. 4 and 5 provide yet another exemplary embodiment illustrating another arrangement of the optical switching assembly 100. In this embodiment, the optical element 110 is coupled to the first end 132 of the second arm 114, while the stop element 108 and electromagnetic core 122 are mounted between the second arm second end 132 and the axis 116. Optionally, a counterbalance 124 can be mounted on the second end of the second arm 132 to make up for weight imbalance that may be present between the second arm ends 130, 134. The first arm 112 is configured to be positioned proximate the second arm second end 136 and have the latch mechanisms 106a, 106b and electromagnetic coils 118a, 118b mounted proximate its first end 134. With regard to the embodiment illustrated in FIG. 4, although two solenoids 104a, 104b are shown, it will be appreciated by those with skill in the art, that a single solenoid configuration, such as the configuration shown in FIG. 2 may also be positioned along the arms 112, 114 in an arrangement similar to those shown in FIGS. 4 and 5.

It will be appreciated by those with skill in the art that one or more optical switching assemblies 100 may be operated separately or together. The optical switching assembly 100 of the invention consumes minimal amounts of power and decreases random access time. Additionally, the design of the optical switching assembly 100 is simple, cost-effective to implement, and light-weight.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical switching assembly, comprising:
   first and second arms coupled to an axis, wherein one of the first and second arms is configured to selectively rotate relative to the other between first and second rotational positions;
   first and second latch mechanisms mounted to the first arm at first and second mounting positions, respectively;
   a stop element coupled to the second arm so as to be positioned between and capable of contacting the first and second latch mechanisms; and
   a solenoid coupled to the first and second arms and configured to provide kinetic energy to the one of the first and second arms configured to rotate to thereby cause the stop element to selectively contact the first latch mechanism and the second latch mechanism.

2. The assembly of claim 1, further comprising an optical element coupled to the second arm.

3. The assembly of claim 2, wherein:
   the second arm has a first and a second end;
   the optical element is coupled to the second arm first end; and
   the stop element and at least a portion of the solenoid are coupled between the axis and the optical element.

4. The assembly of claim 3, further comprising:
   a weight coupled to the second arm second end, wherein the weight is configured to counterbalance the stop element and portion of the solenoid mechanisms.

5. The assembly of claim 2, wherein the optical element comprises one of a filter aperture, a mirror, or a source.

6. The assembly of claim 2, wherein:
   the second arm has a first and a second end;
   the optical element is coupled to the second arm first end; and
   the stop element and at least a portion of the solenoid are coupled between the axis and the second arm second end.

7. The assembly of claim 1, wherein the solenoid further comprises an electromagnetic coil and an electromagnetic core.

8. The assembly of claim 7, wherein the first latch mechanism comprises a pole piece and the electromagnetic coil is coupled proximate thereto.

9. The assembly of claim 7, wherein the electromagnetic core comprises a permanent magnet.

10. The assembly of claim 7, wherein the electromagnetic coil is coupled to the first arm and the electromagnetic core is coupled to the second arm.

11. The assembly of claim 10, wherein the stop element is coupled to the electromagnetic core.

12. The assembly of claim 1, wherein the axis comprises a torsion bar.

13. The assembly of claim 1, wherein the axis comprises a spring assembly.

14. The assembly of claim 1, wherein the axis comprises a torsion spring.

15. The assembly of claim 1, wherein:
    the first rotational position is in an optical path; and
    the second rotational position is out of the optical path.

16. The assembly of claim 1, the first and second mount positions substantially coincide with the first and second rotational positions.

17. The assembly of claim 1, wherein the first latch mechanism comprises a permanent magnet.

18. The assembly of claim 1, wherein the first latch mechanism comprises a pole piece.

19. The assembly of claim 1, wherein the stop element comprises a permanent magnet.

20. A device for switching an optical element into and out of an optical path, comprising:
    first and second arms coupled to an axis, wherein one of the first and second arms is configured to selectively rotate relative to the other between first and second rotational positions;
    first and second latch mechanisms mounted to the first arm at first and second mounting positions that substantially coincide with the first and second rotational positions, respectively;
    a stop element coupled to the second arm so as to be between and capable of contacting the first and second latch mechanisms;
    an electromagnetic coil coupled to the first arm proximate the first and second latch mechanisms; and
    an electromagnetic core coupled to the second arm proximate the stop element,
    wherein the electromagnetic coil is configured to receive an energy pulse to generate a magnetic field in a first direction to cause the electromagnetic core to move the second arm in the first direction until the stop element contacts the first latch mechanism and a second energy pulse to generate a magnetic field in a second direction to cause the electromagnetic core to move the second arm in the second direction until the stop element contacts the second latch mechanism.

21. The device of claim 20, wherein the stop element is coupled to the electromagnetic core.

22. The device of claim 21, wherein the electromagnetic core comprises a permanent magnet.

23. The device of claim 20, wherein:
    the second arm has a first and a second end;
    the optical element is coupled to the second arm first end; and
    the stop element and electromagnetic core are coupled between the axis and optical element.

24. The device of claim 23 wherein the optical element is coupled to the first arm first end and the device further comprises:
    a weight coupled to the second arm second end to counterbalance the stop element, electromagnetic core, and optical element.

25. The device of claim 20, wherein the stop element is a permanent magnet.

26. The device of claim 20, wherein the rotational axis comprises one of a torsion bar and a spring assembly.

27. The device of claim 20, wherein the first and second latch mechanisms comprise pole pieces.

28. The device of claim 20, wherein:
    the second arm has a first and a second end;
    the optical element is coupled to the second arm first end; and
    the stop element and electromagnetic core are coupled between the axis and the second arm second end.

29. A method for switching an optical element into and out of an optical path, the optical element coupled to an optical switching device, the optical switching device comprising a rotating arm coupled to an axis and configured to selectively rotate between first and second rotational positions, a second arm coupled to the axis, a stop element and an electromagnetic core coupled to the rotating arm, an electromagnetic coil coupled to the second arm, and first and second latch mechanisms mounted to the second arm at first and second mounting positions, respectively, positioned and configured to contact the stop element, the method comprising:

pulsing energy to the electromagnetic coil to produce a magnetic field in a first direction;

attracting the electromagnetic core toward the first direction to thereby rotate the rotating arm in the first direction; and latching the stop element to the first latch mechanism to stop rotation of the rotating arm.

* * * * *